US007693313B2

(12) United States Patent  (10) Patent No.: US 7,693,313 B2
Ehlers et al.  (45) Date of Patent: Apr. 6, 2010

(54) PERSONAL AUTHENTICATION DEVICE (75) Inventors: Gerald L. Ehlers, Linden, VA (US); Charles F. Lepple, Round Hill, VA (US); Aaron D. Watts, Herndon, VA (US)

(73) Assignee: Raytheon Company, Waltham, MA (US)

( * ) Notice: Subject to any disclaimer, the term of this patent is extended or adjusted under 35 U.S.C. 154(b) by 1035 days.

(21) Appl. No.: 10/916,993

(22) Filed: Aug. 12, 2004

(65) Prior Publication Data

US 2005/0207624 A1   Sep. 22, 2005

Related U.S. Application Data

(60) Provisional application No. 60/555,138, filed on Mar. 22, 2004.

(51) Int. Cl.
*G06K 9/00* (2006.01)
(52) U.S. Cl. .................. 382/124; 382/125; 382/126; 382/127; 382/128
(58) Field of Classification Search ............... 382/124, 382/125, 126, 127, 128
See application file for complete search history.

(56) References Cited

U.S. PATENT DOCUMENTS

| 2001/0019622 | A1* | 9/2001 | Huang ............... 382/124 |
| 2002/0164057 | A1* | 11/2002 | Kramer ............. 382/124 |
| 2003/0075608 | A1 | 4/2003 | Atherton |
| 2004/0098272 | A1* | 5/2004 | Kapsis et al. ........... 705/1 |

FOREIGN PATENT DOCUMENTS

| CA | 2 142 227 A | 8/1996 |
| EP | 1 326 196 A1 | 7/2003 |
| WO | WO 01/09847 A1 | 2/2001 |

OTHER PUBLICATIONS

PCT/US2004/034383 International Search Report.
Luciano Rila and Chris J. Mitchell, Security Protocols for Biometric-Based Cardholder Authentication in Smartcards, Oct. 2003, pp. 254-264, Kunming, China.
Dr. Edward S. Dunstone, Emerging Biometric Developments: Identifying the Missing Pieces for Industry, Aug. 13, 2001, vol. 1, pp. 351-354.

(Continued)

*Primary Examiner*—Matthew C Bella
*Assistant Examiner*—Mike Rahmjoo
(74) *Attorney, Agent, or Firm*—Daly, Crowley, Mofford & Durkee, LLP (57) ABSTRACT

An identification card includes a fingerprint sensor, an antenna, a dual-mode radio frequency modulator connected to the antenna and digital circuitry having memory to store a digital word, the digital word including a representation of a fingerprint initially scanned by the fingerprint sensor to identify an individual associated with the identification card. The identification card further includes a control processor connected to the digital circuitry and the radio frequency modulator to communicate a signal to the antenna indicative of a successful match between the fingerprint initially scanned by the fingerprint sensor and newly scanned fingerprint. With such an arrangement, a technique is provided biometrically authenticating the identity of an individual passing through a checkpoint without requiring the individual to stop or exit a vehicle and eliminates the need for a central database of biometric data on individuals.

5 Claims, 9 Drawing Sheets

OTHER PUBLICATIONS

Umut Uludag, Arun Ross and Anil Jain, Biometric Template Selection and Update: A Case Study in Fingerprints. Jul. 2004, vol. 37, No. 7., pp. 1533-1542.

European Patent Office Search Report for Application No. 08 008 646.5 2218 dated Jul. 7, 2008.

European Patent Office Search Report for Application No. 04 795 530.7 2218 dated Jul. 3, 2008.

European Patent Office Search Report for Application No. 04 795 530.7 2218 dated Apr. 7, 2008.

Communication Pursuant to Article 94(3) EPC from the European Patent Office, Application No. 04 795 530.7—2218, dated Apr. 8, 2009, pp. 1-3.

* cited by examiner

PERSONAL AUTHENTICATION DEVICE

CROSS-REFERENCE TO RELATED APPLICATIONS

The present application claims the benefit of U.S. Provisional Patent Application No. 60/555,138, filed on Mar. 22, 2004.

STATEMENTS REGARDING FEDERALLY SPONSORED RESEARCH

Not applicable.

FIELD OF THE INVENTION

This invention relates generally to personal authentication devices and more particularly to a fingerprint biometric self-authentication identification card having a radio frequency link.

BACKGROUND OF THE INVENTION

It is common practice to regulate access to territorial borders to authorized individuals. It is also common to control access to portions of business property such as research and development areas, controlled areas such as flight line access, airports, seaports, and vendor-only areas in trade shows. Access to many other locations may also need to be controlled for various reasons. Typically, some form of identification card is used to identify individuals before they are allowed access.

Various forms of identification cards have been used to help identify an individual including paper passports, visas, birth certificates, social security cards, drivers licenses and employee identification cards. Unfortunately each of the latter have been known to be forged thus reducing the acceptance of such identification cards as proof of positive identification. More recently, biometric authentication systems have been introduced where an iris scanner, a fingerprint sensor on kiosk or contact-based smart card is used to help identify an individual or user. The latter generally require the user to stop or exit a vehicle to prove their identity. Facial recognition systems have also been entertained to identify watch-listed persons, but the results have not been satisfactory.

Personal devices are known that allow a user store data in the device for the purpose of providing data to an external system. For example, an identification card having a magnetic strip allow personal information to be stored such as birth dates or social security numbers and the magnetic strip is used to provide the personal information to a magnetic stripe reader. Unfortunately, if the personal device is stolen, an unauthorized user would be able to use the card. To increase the security of such a system, often a personal identification number (PIN) is required, but an unauthorized user would be able to try various PIN numbers until one was found that worked.

SUMMARY OF THE INVENTION

In accordance with the present invention, an identification card includes a fingerprint sensor; and digital circuitry, coupled to the fingerprint sensor, the digital circuitry having memory to store digital words, the digital words indicative of fingerprints initially scanned by the fingerprint sensor to identify an individual associated with the identification card. With such an arrangement data can be stored on the card to properly identify the intended cardholder.

In accordance with a further aspect of the present invention, the digital circuitry further comprises a validation algorithm that verifies newly scanned fingerprints match the initially scanned fingerprints. With such an arrangement, an individual in possession of the identification card can be identified as the intended cardholder. By scanning and enrolling multiple fingerprints into the identification card, users can identify themselves in the event that one fingerprint cannot be scanned due to skin injury or loss of a digit.

In accordance with another embodiment of the present invention, an identification card includes a fingerprint sensor, an antenna, a dual radio frequency modulator (one passive, one active) connected to the antenna, and digital circuitry having memory to store a digital word, the digital word including a representation of fingerprints initially scanned by the fingerprint sensor to identify an individual associated with the identification card. The identification card further includes a control processor connected to the digital circuitry and the radio frequency modulator to securely communicate a signal indicative of a successful match between the fingerprint initially scanned by the fingerprint sensor and newly scanned fingerprint. With such an arrangement, a technique is provided biometrically authenticating the identity of an individual passing through a checkpoint without requiring the individual to stop or exit a vehicle and eliminates the need for a central database of biometric data on individuals.

In accordance with a further aspect of the present invention, the identification card includes an element having a unique feature and a digital word including a representation of the unique feature stored in the memory. With such an arrangement, an interrogation point can interrogate the identification card and the unique feature can be communicated to the interrogation point to first identify the identification card and then the identification card can communicate with the interrogation point that the proper holder of the card is in currently in possession of the card by indicting a successful match between the fingerprint initially scanned by the fingerprint sensor and newly scanned fingerprint. The latter provides a high speed, long distance, i.e. non-proximity, read through an RFID interrogation point. The individual or cardholder can be securely identified as the intended cardholder, and if not, authorities can be alerted that a non-authorized use has occurred. By eliminating the centralized database of biometric data (but permitting the use of legacy databases with the unique feature as a foreign key), the concern of privacy issues of people and governments implementing biometric identification systems is greatly reduced.

BRIEF DESCRIPTION OF THE DRAWINGS

The foregoing features of this invention, as well as the invention itself, may be more fully understood from the following description of the drawings in which.

DETAILED DESCRIPTION OF THE INVENTION

Before providing a detailed description of the invention, it may be helpful to review some of the features of existing identification systems. It is typical to issue to an individual an identification card to help authorities identify the holder. A common identification card is a passport which is primarily used to control access into a country. A passport typically includes the name and address of the individual, an identification number, date of birth, a picture of the individual and other pertinent information that can be used by the authorities to verify the holder of the passport is the individual identified by the passport The latter requires an official to review the contents of the passport and match the features of the individual holding the passport with the passport to verify the individual is who he claims.

Another common identification card is a drivers license which will typically includes the name and address of the individual, an identification number, date of birth, a picture of the individual and other pertinent information that can be used by the authorities to verify the holder of the card is the individual identified by the card. Sometimes, additional indicia are printed on the card so that a scanner, when scanning the indicia, can capture additional information which can then be used to compare with stored data to further verify the identity of the holder of the card. Other identification cards such as controlled area badges, common access cards and employee identification cards have similar features.

More sophisticated identification cards may incorporate additional security features in the card to reduce the possibility of forgery such as magnetic strip, bar codes, microchips and proximity readers to facilitate the reading of the personal information so that it can be used to identify the individual holding the card. It is typical for such systems to capture the information from the card and then compare the information with a centralized database and if the information matches allow access to the location or facility.

The use of centralized databases that store personal information is becoming a security concern for many individuals. With the increase use of computers for collecting and storing information about individuals, many individuals are concerned about their privacy and such information being shared with other unauthorized parties. Many individuals prefer not to have their personal information stored in a centralized database that may be accessed by unauthorized parties.

Radio Frequency Identification (RFID) refers to the process of storing data and retrieving data from integrated circuits using radio frequency transmissions. The primary application for RFID technology is automatic identification or the ability to locate, identify, and track objects. An object may be a product, a container, a vehicle, an animal, a person, or just about anything. A transponder is made up of an Integrated Circuit (IC) combined with an antenna. Transponders are often referred to as "tags" because they are used to "tag" or identify an item. Most RFID transponders start as an inlay. An inlay is an IC and antenna on a clear film backing. Inlays are ideal in manufacturing applications where they are embedded into a product. Alternatively, the inlay can be embedded into labels, badges, or directly into product packaging. Passive transponders reflect energy radiated by an interrogator (reader) meaning they get their power from the RF waves striking them. They have no internal power source of their own. A passive tag is a little thicker than an average sheet of paper. Known passive tags have an effective range of up to 30 feet (10 m). Active transponders include an internal power source and transmitter, which make the tag larger. However, the latter significantly boost the effective operational range of a tag. Active tags can have an effective range over 100 feet (33 m). An embodiment of an active tag is depicted in FIG. 1D as will be described further hereinafter. Interrogators, or readers, are devices that activate and/or power a transponder and retrieve the data stored on the IC. Readers work with antennas for sending and receiving radio signals. The readers typically have some type of a processor to decode the transmitted information.

Figure 1:
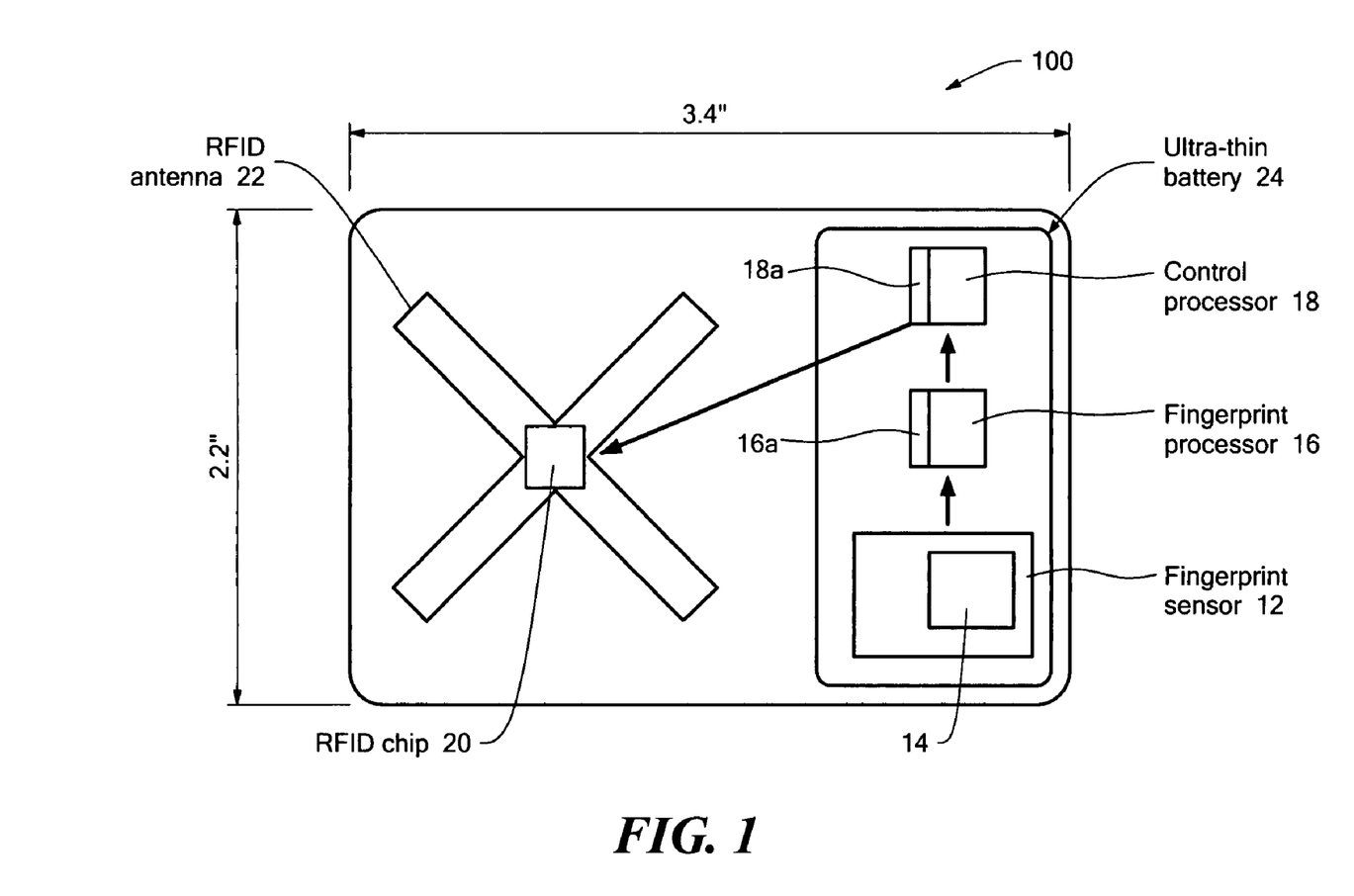
FIG. 1 is a pictorial diagram of a personal authentication device or identification card according to the invention.

Referring now to FIG. 1, a pictorial diagram is shown of a personal authentication device 100 (sometimes referred to as identification card 100) according to the invention including a fingerprint sensor 12. The fingerprint sensor 12 includes a scanner portion 14 where a finger is pressed such that the fingerprint sensor 12 can scan the fingerprint. The scanner portion 14 is a CMOS based sensor having from 300 to 1200 dpi (dots per inch) sensitivity. The fingerprint sensor 12 is connected to a fingerprint processor 16. Fingerprint processor 16 includes memory 16a and is a single chip processor, meaning all of the elements required to do computer processing are built into the integrated circuit (IC). The fingerprint processor 16 includes computer software instructions, as to be described in more detail hereinafter, that controls the fingerprint sensor 12 such that a fingerprint can be scanned when a finger is pressed against the scanner portion 14. A digital word is created that is indicative of and represents the fingerprint that was scanned.

The fingerprint processor 16 is connected to a control processor 18. The control processor 18 includes memory 18a and is also a single chip processor meaning all of the elements required to do computer processing are built into the integrated circuit (IC). The control processor 18 includes computer software instructions, as to be described in more detail hereinafter, that controls the circuitry in the personal authentication device 100. The control processor 18 is connected to a radio frequency identification circuit 20 (sometimes referred to as RFID chip 20). The radio frequency identification circuit 20 is capable of modulating a signal provided by the control processor 18 with a radio frequency signal, here in the frequency range of 868 MHz to 915 MHz. The radio frequency identification circuit 20 is connected to an antenna 22. It should be appreciated when the radio frequency identification circuit 20 is in a transmit mode, a signal provided by the control processor 18 is modulated with the radio frequency signal and emitted by the antenna 22. A receiver (not shown) can capture the radio frequency signal and using known techniques capture the information modulated on the radio frequency signal. Alternatively, when radio frequency identification circuit 20 is in a receive mode, a radio frequency signal captured by the antenna 22 and provided to the radio frequency identification circuit 20 is demodulated and the demodulated signal is passed to the control processor 18. Unlike typical known common access cards which are designed for proximity reads, i.e. a few inches to a foot, the personal authentication device 100 is capable of being read from 8 feet to 20 feet or more.

Figure 1A:
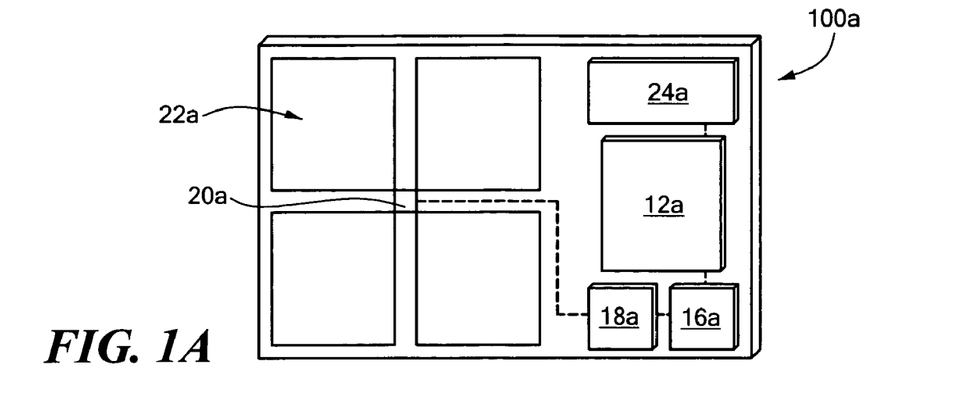
FIG. 1A is a pictorial diagram of an alternative embodiment of a personal authentication device or identification card according to the invention.

Referring now to FIG. 1A, a pictorial diagram is shown of an alternative embodiment of a personal authentication device 100a according to the invention including a fingerprint sensor 12a similar to the fingerprint sensor 12 in FIG. 1. The fingerprint sensor 12a is connected to a fingerprint processor 16a. Similar to FIG. 1, fingerprint processor 16a includes memory and is a single chip processor, including all of the elements required to do computer processing are built into the integrated circuit (IC). The fingerprint processor 16a includes computer software instructions, as to be described in more detail hereinafter, that control the fingerprint sensor 12a such that a fingerprint can be scanned when a finger is pressed against the scanner portion. A digital word is created that is indicative of and represents the fingerprint that was scanned. The fingerprint processor 16a is connected to a control processor 18a. The control processor 18a includes memory and is also a single chip processor meaning all of the elements required to do computer processing are built into the integrated circuit (IC) similar to the control processor 18 of FIG. 1. The control processor 18a is connected to a radio frequency identification circuit 20a (sometimes referred to as RFID chip 20a). The radio frequency identification circuit 20a is capable of modulating a signal provided by the control processor 18a with a radio frequency signal, here also in the frequency range of 868 MHz to 915 MHz. The radio frequency identification circuit 20a is connected to an antenna 22a. It should be appreciated when the radio frequency identification circuit 20a is in a transmit mode, a signal provided by the control processor 18a is modulated with the radio frequency signal and emitted by the antenna 22a. In this embodiment, antenna 22a includes four patch antennas as shown to transmit and receive RF energy. A battery 24a is disposed as shown to provide power to the electronic circuitry disposed within the personal authentication device 100a.

Figure 1B:
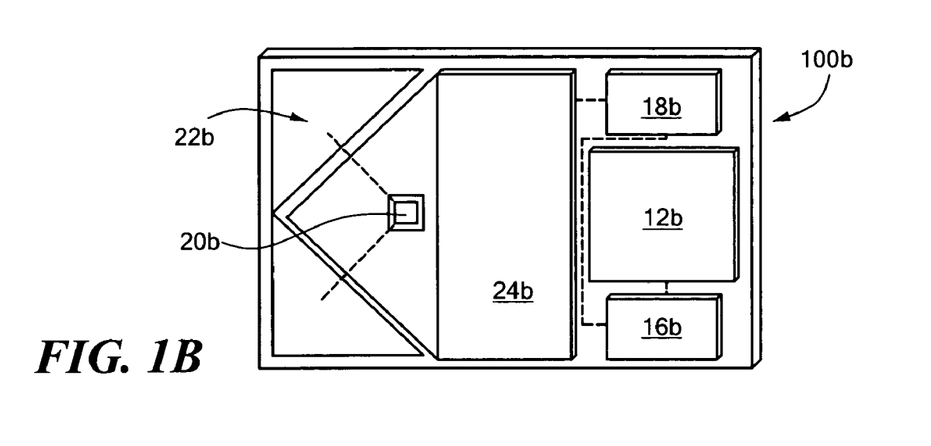
FIG. 1B is a pictorial diagram of an alternative embodiment of a personal authentication device or identification card according to the invention.

Referring now to FIG. 1B, a pictorial diagram is shown of still another embodiment of a personal authentication device 100b according to the invention including a fingerprint sensor 12b similar to the fingerprint sensor 12 in FIG. 1. The fingerprint sensor 12b is connected to a fingerprint processor 16b. Fingerprint processor 16b includes memory and is a single chip processor, including all of the elements required to do computer processing are built into the integrated circuit (IC). The fingerprint processor 16b includes computer software instructions, as to be described in more detail hereinafter, that control the fingerprint sensor 12b such that a fingerprint can be scanned when a finger is pressed against the scanner portion. A digital word is created that is indicative of and represents the fingerprint that was scanned. The fingerprint processor 16b is connected to a control processor 18b. The control processor 18b includes memory and is also a single chip processor meaning all of the elements required to do computer processing are built into the integrated circuit (IC) similar to the control processor 18 of FIG. 1. The control processor 18b is connected to a radio frequency identification circuit 20b. The radio frequency identification circuit 20b is capable of modulating a signal provided by the control processor 18b with a radio frequency signal, here also in the frequency range of 868 MHz to 915 MHz. The radio frequency identification circuit 20b is connected to an antenna 22b. In this embodiment, antenna 22b includes an alternative shaped antenna as shown to transmit and receive RF energy. A battery 24b is disposed as shown to provide power to the electronic circuitry disposed within the personal authentication device 100b. In this embodiment, the battery 24b is maximized taking advantage of the space available within the personal authentication device 100b to provide longer battery life.

Figure 1C:
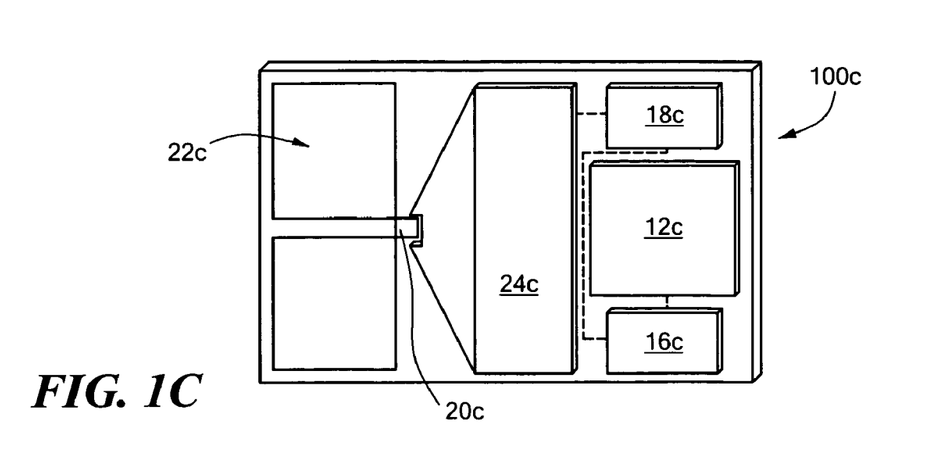
FIG. 1C is a pictorial diagram of an alternative embodiment of a personal authentication device or identification card according to the invention.
Figure 1D:
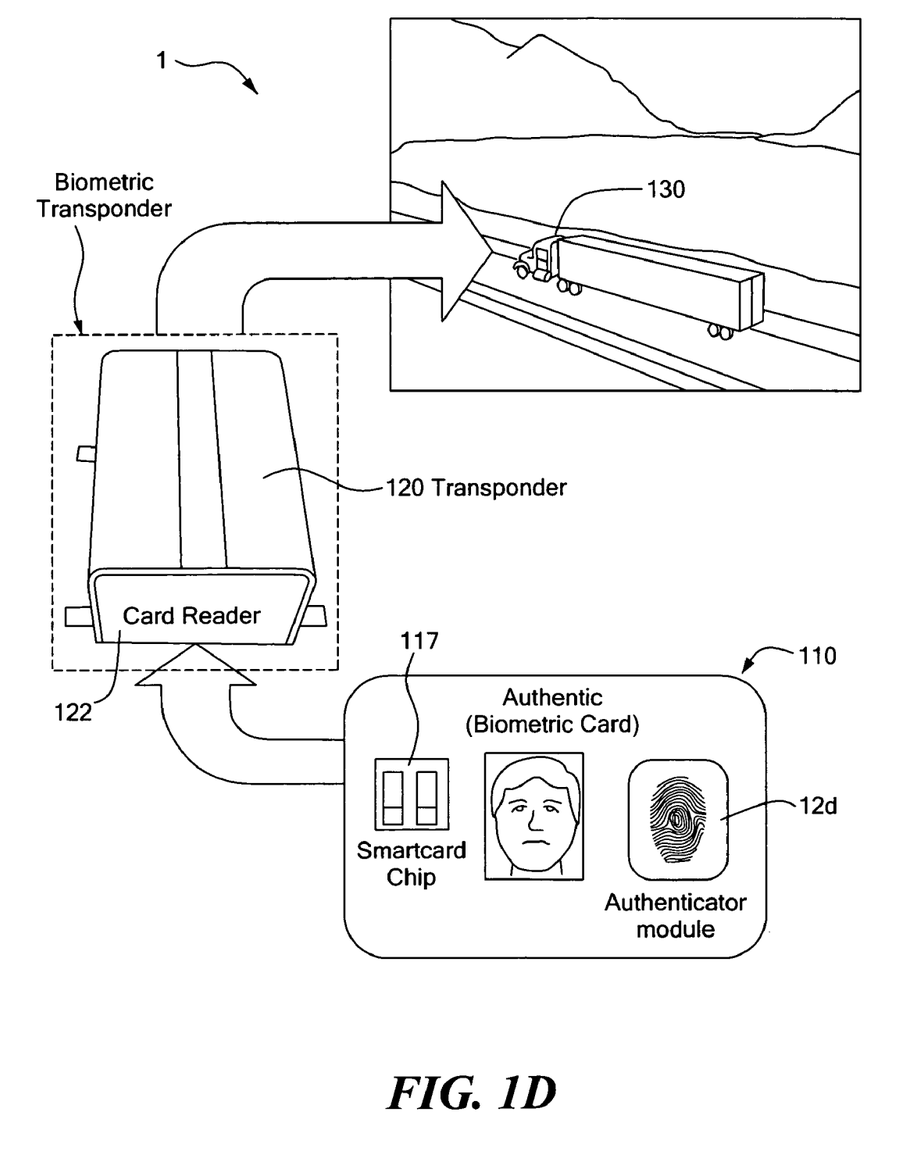
FIG. 1D is a pictorial diagram of an alternative embodiment of a personal authentication device or identification card according to the invention where the radio frequency circuitry is disposed in a separate transponder.

Referring now to FIG. 1C, a pictorial diagram is shown of still another embodiment of a personal authentication device 100c according to the invention including a fingerprint sensor 12c similar to the fingerprint sensor 12 in FIG. 1. The fingerprint sensor 12c is connected to a fingerprint processor 16c. Fingerprint processor 16c includes memory and is a single chip processor. The fingerprint processor 16c includes computer software instructions, as to be described in more detail hereinafter, that control the fingerprint sensor 12c such that a fingerprint can be scanned when a finger is pressed against the scanner portion. A digital word is created that is indicative of and represents the fingerprint that was scanned. The fingerprint processor 16c is connected to a control processor 18c. The control processor 18c includes memory and is also a single chip processor similar to the control processor 18 of FIG. 1. The control processor 18c is connected to a radio frequency identification circuit 20c. The radio frequency identification circuit 20c is connected to an antenna 22c. In this embodiment, antenna 22c includes still another alternative antenna as shown to transmit and receive RF energy. A battery 24c is disposed as shown to provide power to the electronic circuitry disposed within the personal authentication device 100c.

Referring now to FIG. 1D, a pictorial diagram is shown of a still further alternative embodiment of a personal authentication device, here fingerprint verification card 110 according to the invention including a fingerprint sensor 12d similar to the fingerprint sensor 12 in FIG. 1. The fingerprint sensor 12d is connected to a fingerprint processor (not shown) which includes memory and is a single chip processor, including all of the elements required to do computer processing are built into the integrated circuit (IC). The fingerprint processor (not shown) includes computer software instructions, as to be described in more detail hereinafter, that controls the fingerprint sensor 12d such that a fingerprint can be scanned when a finger is pressed against the scanner portion. The fingerprint processor is connected to a smart card chip 117 which includes memory to store pertinent information and communication with a card reader 122 included with transponder 120. In this embodiment, the radio frequency identification circuit or RFID chip is not disposed in the personal authentication device 110, but a separate powered transponder 120 is used which interfaces with the personal authentication device 110.

Figure 5:
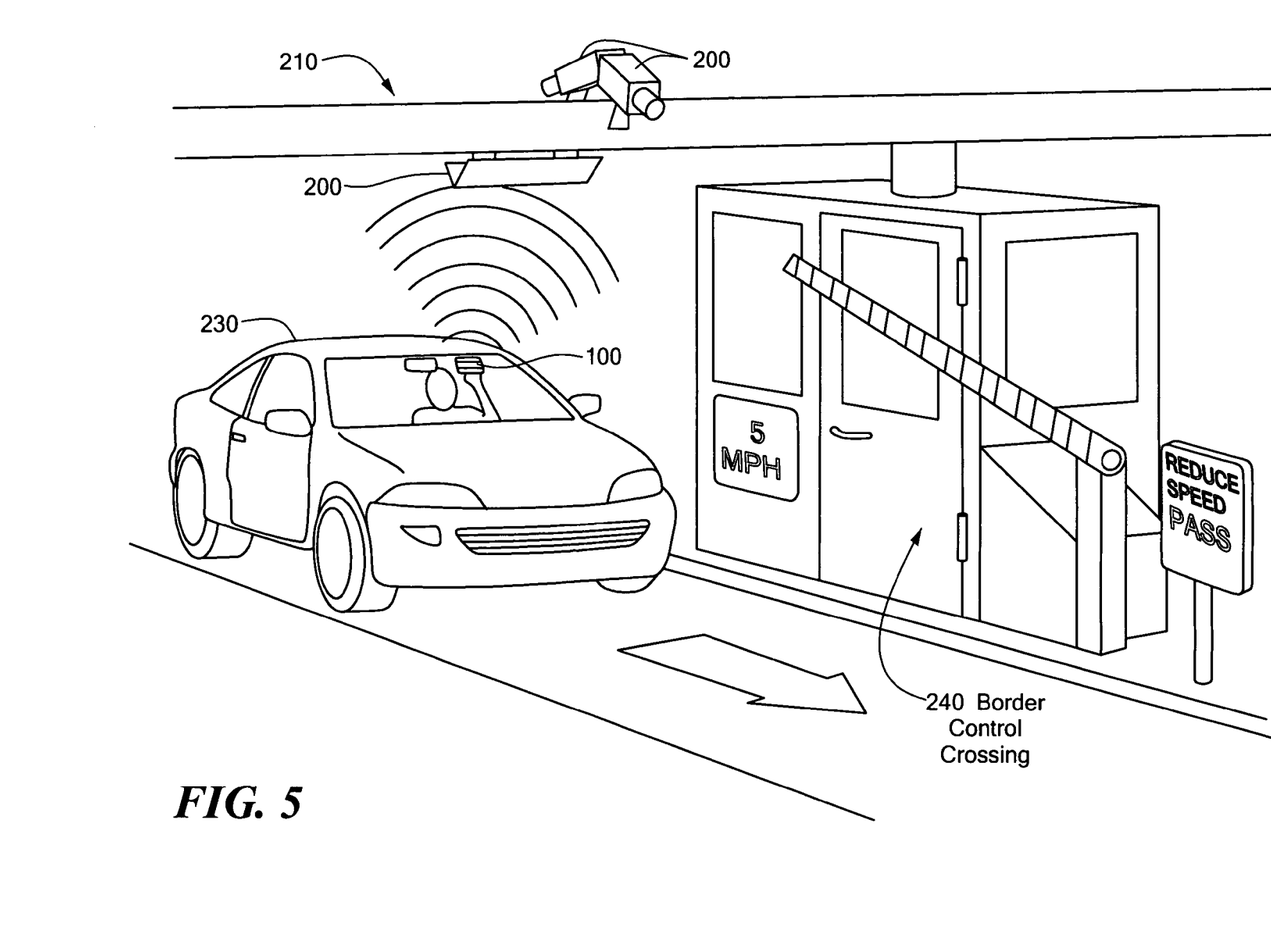
FIG. 5. is a block diagram of an identification system utilizing the personal authentication device according to the invention.

The active tag system 1 shown in FIG. 1D is intended to authenticate a driver of a vehicle 130. The active tag system 1 includes two separate subsystems: a fingerprint verification card 110 (also referred to as identification card 110), and a powered transponder 120 that interfaces with the card 110. The fingerprint authenticator module 12 encompasses elements 12 and 16 from FIG. 1, and the smart card chip 117 performs, the functions of the control processor 18 of FIG. 1. A card reader 122 in the transponder 120 allows the RF circuitry in the transponder to receive a message from the smart card chip 117. This message, including the result of the fingerprint matching operation, is relayed by the transponder 120 to a stationary reader 200 (FIG. 5). The transponder 120 is intended to be permanently mounted in a vehicle 130. To secure the system from theft, a user need only remove the card 110 from the card reader 120. The transponder 120 need not contain any unique identification code, allowing a driver to authenticate his identity from any other vehicle equipped with a transponder 120.

Figure 2:
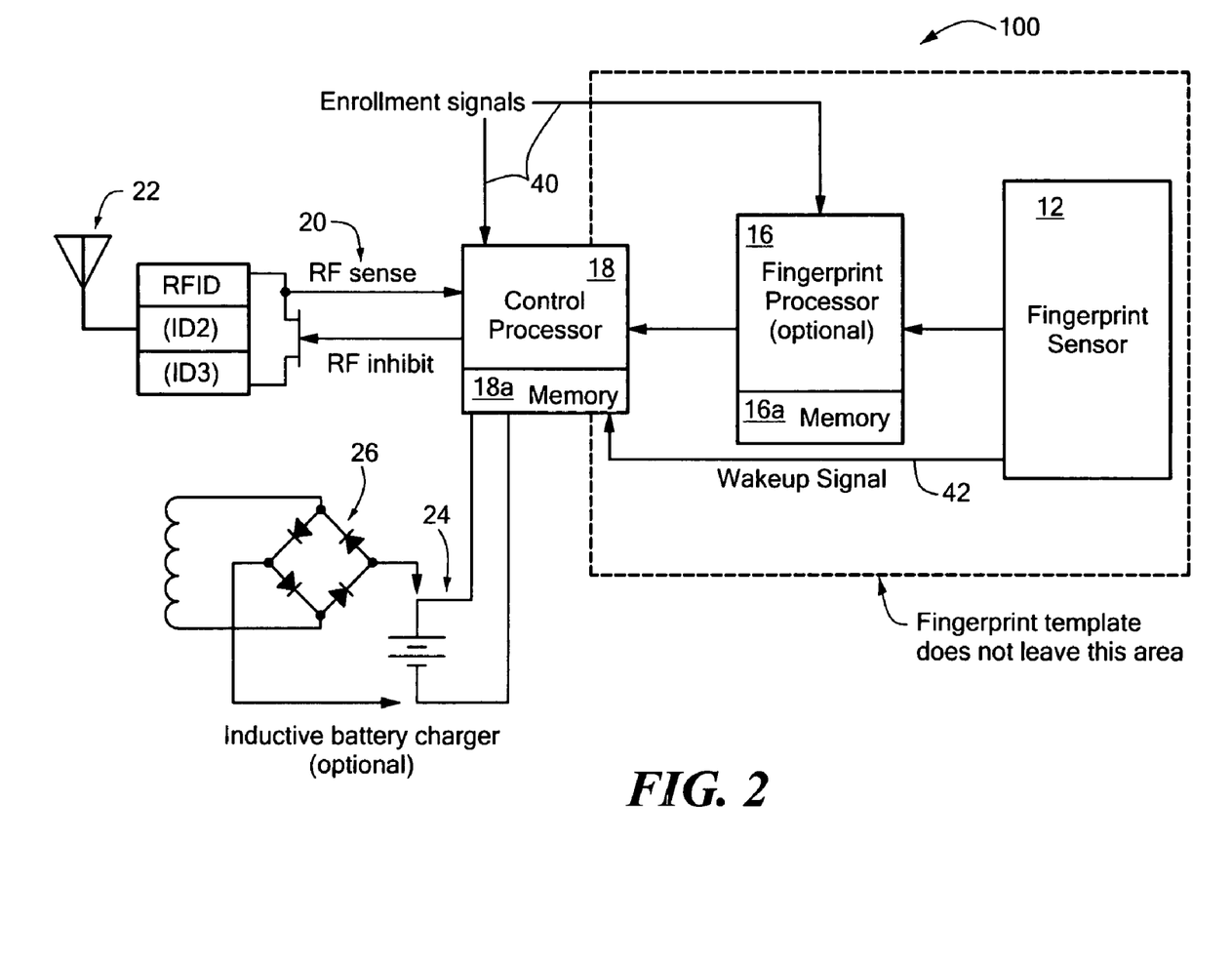
FIG. 2 is block diagram of a personal authentication device according to the invention.

It should be appreciated each of the embodiment of FIGS. 1 and 1A-1C and FIG. 1D include corresponding elements as shown in the block diagram of FIG. 2 and cooperate accordingly.

Referring now to FIG. 2, a block diagram is shown of a personal authentication device 100 (identification card 100) according to the invention including a fingerprint sensor 12. The fingerprint sensor 12 includes a scanner portion 14 where a finger is pressed such that the fingerprint sensor 12 can scan the fingerprint. The fingerprint sensor 12 is connected to a fingerprint processor 16. Fingerprint processor 16 includes memory 16a and is a single chip processor meaning all of the elements required to do computer processing is built into the integrated circuit (IC). The fingerprint processor 16 includes computer software instructions that control the fingerprint sensor 12 such that a fingerprint can be scanned when a finger is pressed against the scanner portion 14. A digital word is created that is indicative of and represents the fingerprint that was scanned. The fingerprint processor 16 is connected to a control processor 18 having memory 18a that includes computer software instructions that controls the circuitry in the personal authentication device 100. It should be appreciated that fingerprint processor 16 and control processor 18 can be separate devices as shown or can be a single processor including combined software instructions depending on the embodiment being implemented. Alternatively, fingerprint processor 16 or control processor 18, each individually or combined, can each be implemented with an application specific integrated circuit (ASIC) or state machine. The control processor 18 is connected to a radio frequency identification circuit 20. The radio frequency identification circuit 20 is capable of operating in the frequency range of 868 MHz to 915 MHz, although other frequency ranges could be used. The radio frequency identification circuit 20 is connected to an antenna 22. Additionally, a battery 24 is provided to power the control processor 18, the fingerprint sensor 16 and associated circuitry. Also shown is an optional inductive battery charger 26 that is used to charge the battery 24.

In operation, to initiate and activate the personal authentication device 100 (sometimes referred to hereinafter as card 100), an enrollment signal 40 is fed to the control processor 18 and the fingerprint processor 16. A unique digital code is programmed into the memory 18a to uniquely identify the card 100. This unique code can later be used to identify this particular card 100. At this time other optional information can be added to memory 18a regarding personal history and information of the person that the card is being programmed for. Next, the anticipated holder or owner of the card is instructed to place his or her finger against the scanner portion 14 of the fingerprint sensor 12 and the fingerprint of the holder is scanned and stored in memory 16a or alternatively in memory 18a. Additionally a verification code is stored in memory 18a. The latter completes the initiation and activation of the card 100 for the new owner of the card 100. The card 100 is now associated with a particular owner or holder having stored in memory 18a a unique identification code that identifies the particular card 100, a verification code that verifies the card and a unique digital word that is the digital representation of the fingerprint of the individual associated with the card. It should be appreciated that the unique digital word that is the digital representation of the fingerprint of the individual associated with the card is stored in the card 100 and not provided to a central database or other computer.

Referring now also to FIG. 5, an identification system 210 is shown to include the personal authentication device 100 and a reader 200 installed at a border control crossing 240 to control and regulate access to territorial borders to authorized individuals. Also shown is a traffic monitoring camera 220 which can be used by a border control officer to monitor oncoming vehicles and the occupants therein. As a vehicle 230 approaches the reader 200, the owner of the personal authentication device 100 places his or her finger against the scanner portion 14 of the fingerprint sensor 12. The latter provides a wakeup signal 42 to the control processor 18 that activates the digital circuitry. The wakeup signal 42 is used to increase battery life by allowing the digital circuitry to enter into a sleep mode which reduces drain on the battery. The fingerprint processor 16 processes the newly scanned fingerprint and using a fingerprint identification algorithm compares the newly scanned fingerprint with the original fingerprint stored in memory 16a or memory 18a. If the fingerprints match, then a proper authentication code is stored in memory 18a so that it can be transmitted to the reader 200.

As the personal authentication device 100 arrives within the field of view of the reader 200, the reader queries the personal authentication device 100 for its identification code. The control processor 18 provides the identification code to the radio frequency identification circuit 20 and the identification code is transmitted using antenna 22 to the reader 200. Once the reader 200 had validated the identification code, the reader 200 waits for the authentication code. Since the fingerprints match, the proper authentication code stored in memory 18a is transmitted to the reader 200 and the individual or owner is allowed access through the border. To further improve the security of the identification system 210, the verification code previously stored in memory 18a can also be transmitted to the reader 200 to be used with the authentication code to properly authenticate the security of the card 100. Furthermore, to increase the security of the card, the reader 200 can optionally, after authenticating the card 100, transmit a new verification code to card 100 that is stored in memory 18a. This new verification code may then be used the next time the card is queried. The latter increases the security of the card as the card is used with the identification system 210. If the verification code and authentication code does not match, then a signal can be sent to the card 100 to disable the card 100. The latter will then require the owner of the card 100 to stop at the border control crossing and receive a personal interrogation.

Figure 2A:
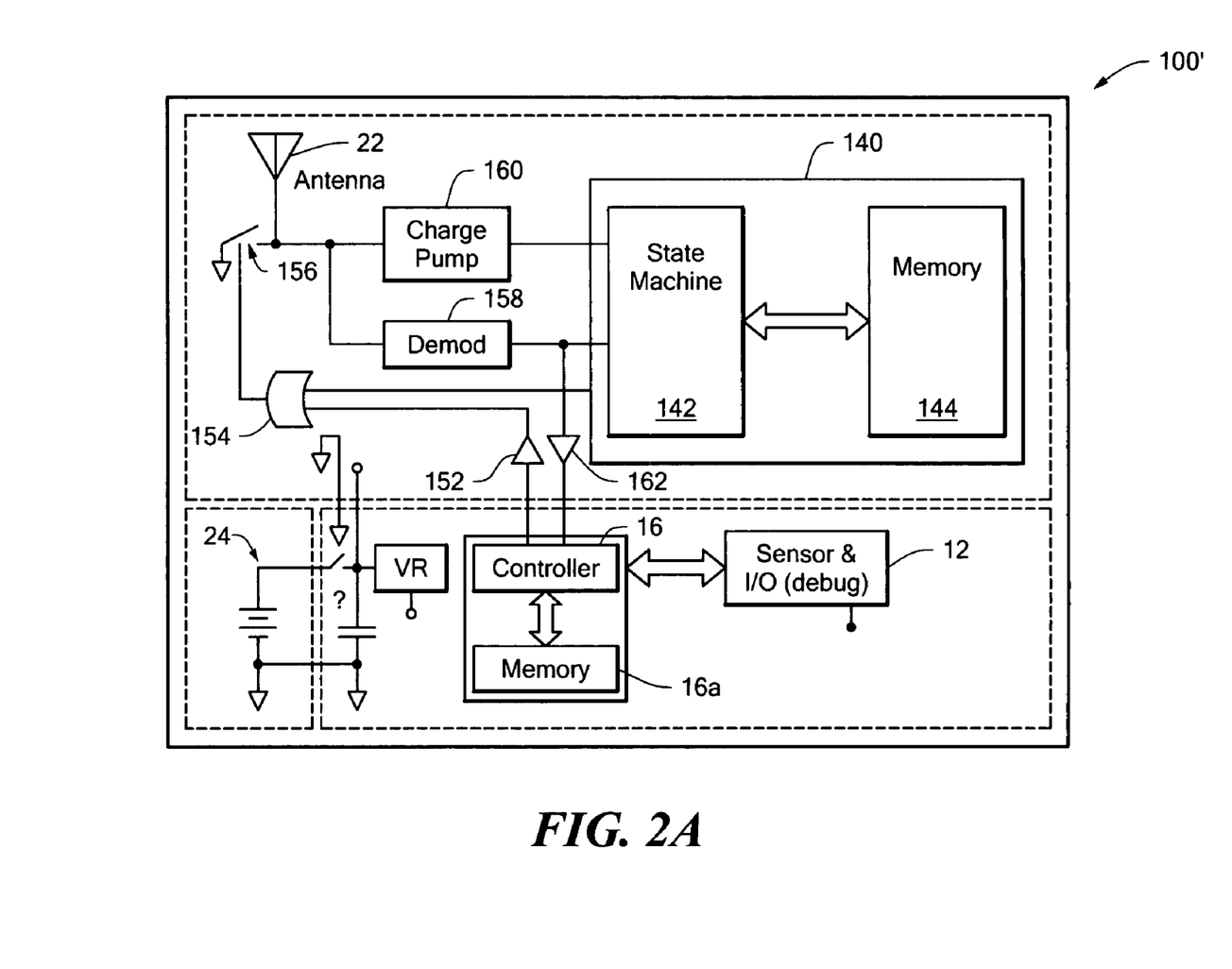
FIG. 2A is block diagram of an alternative embodiment of a personal authentication device according to the invention.

Referring now to FIG. 2A, an alternative block diagram is shown of a personal authentication device 100' according to the invention including a fingerprint sensor 12. The fingerprint sensor 12 includes a scanner portion 14 where a finger is pressed such that the fingerprint sensor 12 can scan the fingerprint. The fingerprint sensor 12 is connected to a fingerprint processor 16. Fingerprint processor 16 includes memory 16a and is a single chip processor meaning all of the elements required to do computer processing is built into the integrated circuit (IC). The fingerprint processor 16 includes computer software instructions that controls the fingerprint sensor 12 such that a fingerprint can be scanned when a finger is pressed against the scanner portion 14. In this embodiment, a commercially available RFID tag 140 is used to store and provide the common information that will be communicated with a card reader 200. The RFID tag 140 includes a state machine 142 and memory 144 and operates in a know manner. An antenna 22 is shared with the RFID tag 140 and the fingerprint processor 16. The fingerprint processor 16 is connected via amplifier 152 to a modulator 154. The modulator 154 is connected to an electronic switch 156, which, when activated, connects the modulator 154 to the antenna 22 when in a transmit mode. A second input to the modulator 154 is connected to the state machine 142. The modulator 154 is capable of operating in the frequency range of 868 MHz to 915 MHz, although other frequency ranges could be used. In a receive mode, the antenna 22 is connected to a demodulator 158 and a charge pump 160. The charge pump 160 is connected to the state machine 142 of the RFID tag 140. The demodulator 158 is connected to an amplifier 162 which in turn is connected to the controller or fingerprint processor 16. The demodulator 158 is also connected to the state machine 142. With such an arrangement, the antenna 22 can be used with the RFID tag 140 as well as the circuitry associated with the fingerprint sensor 12 and fingerprint processor 16. A battery 24 is provided to apply power to the circuitry of the personal authentication device 100'.

In operation, to initiate and activate the personal authentication device 100' (identification card 100'), a unique digital code is programmed into the memory 144 to uniquely identify the card 100'. This unique code can later be used to identify this particular card 100'. Other optional information can also be added to memory 144 regarding personal history and information of the person that the card is being programmed for. Next, the anticipated holder or owner of the card is instructed to place his or her finger against the scanner portion of the fingerprint sensor 12 and the fingerprint of the holder is scanned and stored in memory 16a or alternatively in memory 144. Additionally a verification code is stored in memory 144. The latter completes the initiation and activation of the card 100' for the new owner of the card 100'. The card 100' is now associated with a particular owner or holder having stored in memory 144 a unique identification code that identifies the particular card 100', a verification code that verifies the card and a unique digital word that is the digital representation of the fingerprint of the individual associated with the card. It should again be appreciated that the unique digital word that is the digital representation of the fingerprint of the individual associated with the card is stored in the card 100' and not provided to a central database or other computer.

In a similar manner, referring again also to FIG. 5, as a vehicle 230 approaches the reader 200, the owner of the personal authentication device 100' places his or her finger against the scanner portion of the fingerprint sensor 12. The latter provides a wakeup signal to the control processor 16 that activates the digital circuitry. As described above, the wakeup signal is used to increase battery life by allowing the digital circuitry to enter into a sleep mode to reduce drain on the battery. The controller 16 processes the newly scanned fingerprint and using a fingerprint identification algorithm compares the newly scanned fingerprint with the original fingerprint stored in memory 16a or memory 144. If the fingerprints match, then a proper authentication code is stored in memory 18a so that it can be transmitted to the reader 200.

As the personal authentication device 100' arrives within the field of view of the reader 200, the reader queries the personal authentication device 100' for its identification code. The control processor 16 provides the identification code to the modulator 154 and the identification code is transmitted using antenna 22 to the reader 200. Once the reader 200 had validated the identification code, the reader 200 waits for the authentication code. Since the fingerprints match, the proper authentication code stored in memory 16a is transmitted to the reader 200 and the individual or owner is allowed access through the border. To further improve the security of the identification system 210, the verification code previously stored in memory 144 as well as other optionally stored information can also be transmitted to the reader 200 to be used with the authentication code to properly authenticate the security of the card 100'.

Figure 3:
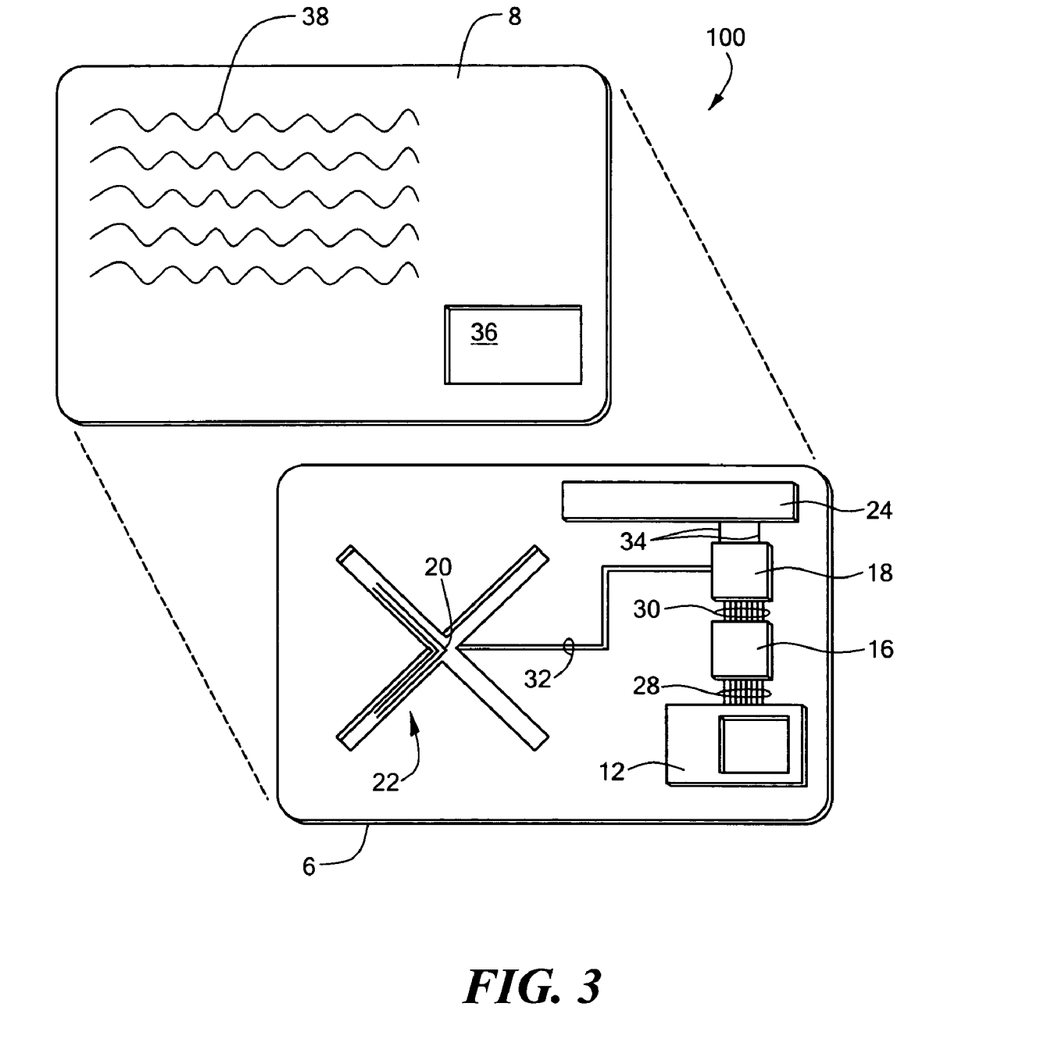
FIG. 3 is a preferred embodiment of a personal authentication device according to the invention.

Referring now to FIG. 3, a preferred embodiment is shown of a personal authentication device 100. A first layer 6 fabricated from polyvinyl chloride (PVC), polyethylene terpthalate (PET) or other suitable material is provided to dispose the fingerprint sensor 12, the fingerprint processor 16, the control processor 18 and the radio frequency identification circuit 20 and antenna 22 as shown. Additionally, a battery 24 is provided to power the control processor 18, the fingerprint sensor 16 and associated circuitry. A second layer 8 also fabricated from PVC or PET material is provided to cover the fingerprint sensor 12, the fingerprint processor 16, the control processor 18 and the radio frequency identification circuit 20 and antenna 22 as shown with a recess 36 provided in layer 8 to accommodate the fingerprint sensor 12. It should be appreciated material other than PVC may be used to provide layer 6 and layer 8 as is known in the art of manufacturing identification cards. It should be appreciated each of the identification cards of FIGS. 1A-1D can be fabricated in such a manner.

Figure 4A:
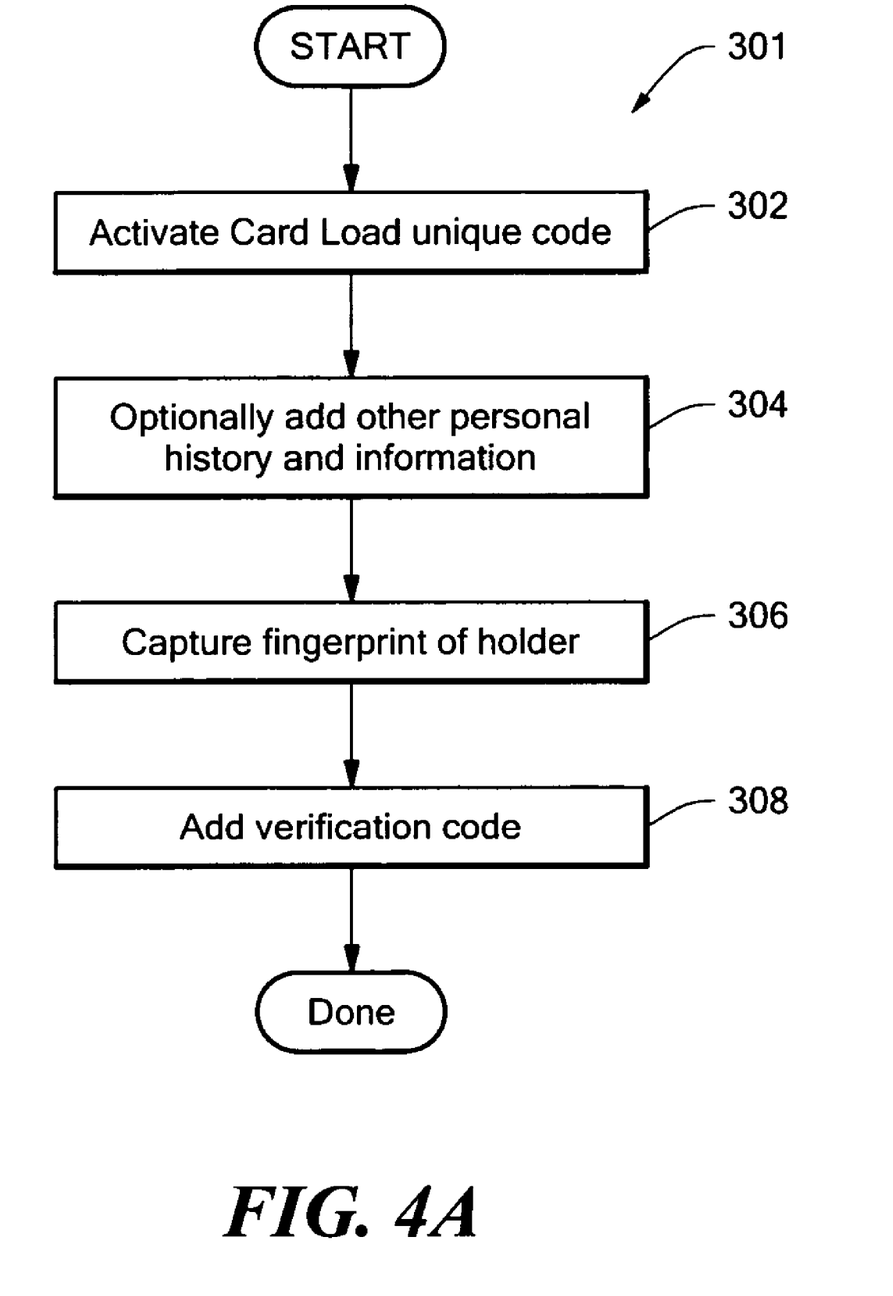
FIGS. 4A and 4B are flow diagrams illustrating the steps to implement the features of the personal authentication device according to the invention.
Figure 4B:
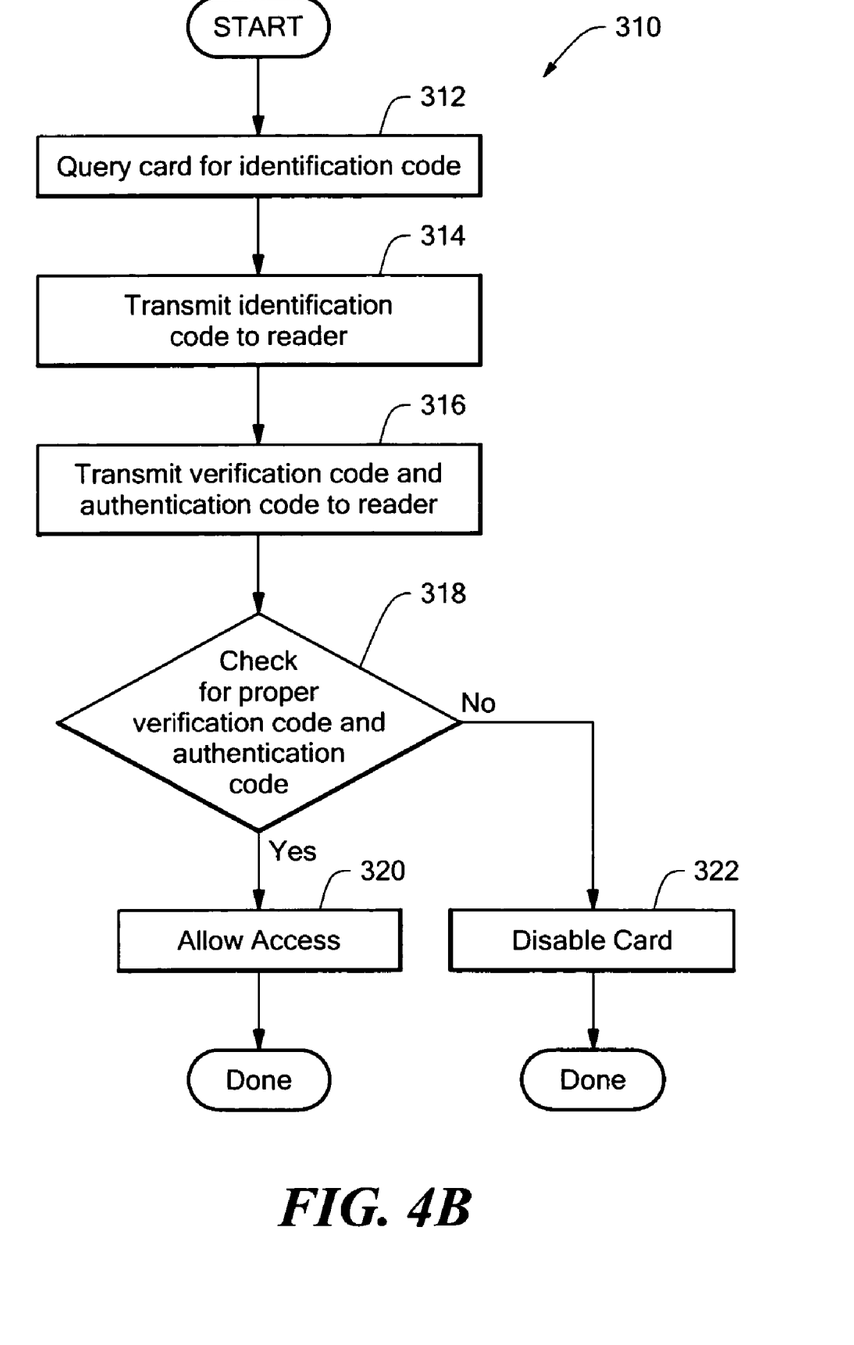

It should be appreciated that FIGS. 4A and 4B show a flowchart corresponding to the below contemplated technique which would be implemented in personal authentication device 100 (FIG. 1). The rectangular elements (typified by element 302 in FIG. 4A, herein denoted "processing blocks," represent computer software instructions or groups of instructions. The diamond shaped elements (typified by element 318 in FIG. 4B), herein denoted "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit, an application specific integrated circuit (ASIC), or an application-specific standard product (ASSP). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 4A, the processing steps implemented in fingerprint processor 16 and control processor 18 is shown for the card activation process 301 and begins at block 302 where an activate card and load unique code step is performed. At block 304, an optionally add other personal history and information step is performed when required. Next at block 306, a capture fingerprint of holder step is performed and the fingerprint is stored in memory 16a or memory 18a. Next at block 308, an add verification code step is performed where the verification code is stored in memory 18a. This completes the steps of activating the personal authentication card 100 or the various embodiments taught herein.

Referring now to FIG. 4B, the processing steps implemented in fingerprint processor 16 and control processor 18 is shown for the card authentication process 310 and begins at block 312 where a query card for identification code step is performed where the card 100 recognizes that a reader is in the vicinity. Next, at block 314 a transmit identification code to reader step is performed where the identification code of the card is transmitted to the reader. Once the reader has recognized the identity of the card 100, a transmit verification code and authentication code to reader step is performed as shown in block 316. As shown in decision block 318, a check verification code and authentication code step is performed. If positive, the result is communicated to the individual and as shown in block 320 the individual is allowed access. If negative, as shown in block 322 the card is disabled. It should be appreciated during step 320, if the option of updating the verification code is being used, then during this step a new verification code is also communicated to the personal authentication device 100 and stored in memory 18a.

Having described various embodiments of the invention, it should now be appreciated that such an identification card includes a fingerprint sensor; and digital circuitry, coupled to the fingerprint sensor, the digital circuitry having memory to store a digital word, the digital word indicative of a fingerprint initially scanned by the fingerprint sensor to identify an individual associated with the identification card. Furthermore, the digital circuitry includes a validation algorithm that verifies a newly scanned fingerprint matches the initially scanned fingerprint.

The identification card may also include digital circuitry to prevent a scanned digital word indicative of a second different fingerprint from being stored in memory in place of the digital word indicative of the fingerprint initially scanned and also may include digital circuitry to prevent the identification card from being read by a card reader when the newly scanned fingerprint does not match the initially scanned fingerprint. To add a further security feature to the identification card, the identification card can also include digital circuitry to replace the digital word representative of the unique feature with a different digital word. To provide a still further security feature, the identification card also includes digital circuitry to disable the fingerprint sensor when the newly scanned fingerprint does not match the initially scanned fingerprint after a predetermined number of attempts. Alternatively, the identification card can include a disabling circuit to disable the radio frequency modulator if the identification card is compromised. The identification card may also include an element having a unique feature and store a digital word indicative of the unique feature.

In a preferred embodiment of the identification card, the card includes an antenna and a dual radio frequency modulator (one passive and one active) coupled to the antenna and to the digital circuitry to communicate with an RF reader to indicate a successful match between the fingerprint initially scanned by the fingerprint sensor and the newly scanned fingerprint such that the holder of the card may freely pass. Alternatively, the radio frequency modulator and antenna can be housed in a separate transponder and the information on the identification card can be communicated to the transponder using a card reader.

It should be appreciated that the digital circuitry can be implemented using ASICs, ASSPs, gate arrays, digital signal processors having memory with associated software instructions or a combination thereof.

Having described the preferred embodiments of the invention, it will now become apparent to one of ordinary skill in the art that other embodiments incorporating their concepts may be used. It is felt therefore that these embodiments should not be limited to disclosed embodiments but rather should be limited only by the spirit and scope of the appended claims.

What is claimed is:

1. An identification card comprising:
    (a) indicia printed on a surface of the identification card to identify a particular identification card;
    (b) digital circuitry having memory to store a digital word indicative of the external indicia to identify the particular identification card;
    (c) a fingerprint sensor;
    (d) digital circuitry, coupled to the fingerprint sensor, the digital circuitry comprising:
        (i) memory to store a digital word, the digital word indicative of a fingerprint initially scanned by the fingerprint sensor to identify an individual associated with the particular identification card, and
        (ii) a fingerprint validation algorithm that verifies a newly scanned fingerprint matches the initially scanned fingerprint to verify the individual providing the newly scanned fingerprint is the individual associated with the particular identification card;
    (e) digital circuitry to disable the fingerprint sensor when the newly scanned fingerprint does not match the initially scanned fingerprint after a predetermined number of attempts;
    (f) an antenna;
    (g) a dual-mode radio frequency modulator coupled to the antenna and coupled to the digital circuitry; and
    (h) a control processor connected to the digital circuitry and the radio frequency modulator to communicate a signal to the radio frequency modulator indicative of a successful match between the fingerprint initially scanned by the fingerprint sensor and the newly scanned fingerprint to identify the individual associated with the particular identification card,
wherein the identification card further comprises digital circuitry to replace the digital word indicative of the initially scanned fingerprint with a second digital word indicative of the newly scanned fingerprint when the fingerprint validation algorithm verifies that the newly scanned fingerprint matches the initially scanned fingerprint.

2. The identification card as recited in Claim 1 further comprising digital circuitry to prevent a scanned digital word indicative of a second different fingerprint from being stored in memory in place of the digital word indicative of the fingerprint initially scanned.

3. The identification card as recited in Claim 1 further comprising digital circuitry to prevent the identification card from being read by a card reader when the newly scanned fingerprint does not match the initially scanned fingerprint.

4. The identification card as recited in Claim 1 further comprising a disabling circuit to disable the radio frequency modulator if the identification card is compromised.

5. The identification card as recited in Claim 1 wherein the processor includes instructions to replace a digital verification word indicative of a success of a fingerprint matching operation with a new verification word to prevent replay attacks.

* * * * *

UNITED STATES PATENT AND TRADEMARK OFFICE
CERTIFICATE OF CORRECTION

| | | |
|---|---|---|
| PATENT NO. | : 7,693,313 B2 | Page 1 of 1 |
| APPLICATION NO. | : 10/916993 | |
| DATED | : April 6, 2010 | |
| INVENTOR(S) | : Ehlers et al. | |

It is certified that error appears in the above-identified patent and that said Letters Patent is hereby corrected as shown below:

Column 1, line 47 delete "user store" and replace with --user to store--.

Column 1, line 50 delete "allow" and replace with --allows--.

Column 1, line 52 delete "stripe" and replace with --strip--.

Column 2, lines 37-38 delete "is in currently" and replace with --is currently--.

Column 3, line 5 delete "FIG. 2 a" and replace with --FIG. 2 is a--.

Column 3, line 7 delete "FIG. 2A a" and replace with --FIG. 2A is a--.

Column 3, line 35 delete "includes" and replace with --include--.

Column 7, line 4 delete "appreciated each of the embodiment" and replace with --appreciated that each of the embodiments--.

Column 8, line 27 delete "had" and replace with --has--.

Column 8, line 63 delete "know" and replace with --known--.

Column 9, line 60 delete "had" and replace with --has--.

Column 10, lines 17-18 delete "appreciated material" and replace with --appreciated that material--.

Column 10, line 26 delete "FIG. 4A," and replace with --FIG. 4A),--.

Signed and Sealed this

Twenty-seventh Day of July, 2010

David J. Kappos
*Director of the United States Patent and Trademark Office*